United States Patent
Thu et al.

(10) Patent No.: US 6,190,177 B1
(45) Date of Patent: Feb. 20, 2001

(54) SYSTEM FOR DETECTION OF THE POSITION OF ELECTRODES OF A DEFIBRILLATOR ON A TRAINING MANIKIN

(75) Inventors: Kjell R. Thu, Bryne; Harald Vatne, Naerbo; Hakon Hodne, Kleppe; Helge Fossan; Helge Myklebust, both of Stavanger, all of (NO)

(73) Assignee: Laerdal Medical AS, Stavanger (NO)

( * ) Notice: Under 35 U.S.C. 154(b), the term of this patent shall be extended for 0 days.

(21) Appl. No.: 09/386,842

(22) Filed: Aug. 31, 1999

(30) Foreign Application Priority Data

Sep. 15, 1998 (NO) .................................................. 4270/98

(51) Int. Cl.$^7$ .................................................. G09B 23/28
(52) U.S. Cl. .......................................................... 434/265
(58) Field of Search ..................... 434/262, 265, 434/266, 267, 270, 272; 607/5; 600/382, 386, 390, 392

(56) References Cited

U.S. PATENT DOCUMENTS

| | | |
|---|---|---|
| 5,137,458 | 8/1992 | Ungs et al. . |
| 5,275,572 * | 1/1994 | Ungs ..................... 434/265 |
| 5,611,815 * | 3/1997 | Cole ......................... 607/5 |
| 5,662,690 * | 9/1997 | Cole ......................... 607/5 |
| 5,853,292 * | 12/1998 | Eggert ................... 434/262 |
| 5,993,219 * | 11/1999 | Bishay ................... 434/265 |

FOREIGN PATENT DOCUMENTS

| | | |
|---|---|---|
| 0 437 339 | 7/1991 | (EP) . |
| 0 499 744 | 8/1992 | (EP) . |
| 2 339 323 | 1/2000 | (GB) . |

* cited by examiner

*Primary Examiner*—Jacob K. Ackun
*Assistant Examiner*—Kurt Fernstrom
(74) *Attorney, Agent, or Firm*—Nixon & Vanderhye P.C.

(57) ABSTRACT

A system for detecting an electrode position for a defibrillator on a manikin includes electrical conductive faces that are provided in hidden positions under the manikin skin in locations that correspond to correct and incorrect positions for placement of the defibrillator respectively, and which constitute the respective halves of a capacitor. The faces are connected to a first and a second oscillator respectively, which oscillators emit two different frequencies. A position indicator may be arranged inside the manikin, which indicator will give notification to the user by the use of light sources, e.g., light emitting diodes that shine through the manikin skin, or by activation of a sound signal. A signal analyzing device judges the correctness of the electrode positions via output from the oscillators.

10 Claims, 2 Drawing Sheets

SYSTEM FOR DETECTION OF THE POSITION OF ELECTRODES OF A DEFIBRILLATOR ON A TRAINING MANIKIN

BACKGROUND

The present invention relates to system for detection of the position of electrodes of a defibrillator or a training defibrillator on a training manikin.

For years, the use of defibrillators in the case of sudden cardiac arrest has been recognized as the only curative treatment. Defibrillation involves the discharge of an electric pulse with relatively high energy through electrodes connected to the patient's chest. Several designs of electrodes exist, but generally they can be divided into two groups: "Paddles" are electrodes that are held manually on the chest. Adhesive electrodes or "pads" are electrodes that are fixed to the chest by the use of a conducting adhesive.

The electrodes are used both to discharge the electrical shock, to measure the patient's ECG, and to measure any impedance.

Defibrillation may, by its very nature, involve a risk for those who treat the patient, if they touch the patient or in any other way come into contact with the electrodes.

Traditionally, highly trained personnel in hospitals have carried out defibrillation. However, defibrillators have become much easier to use over the last ten years, and thus have also come to be used outside of the hospitals, primarily by the ambulance services. There is also a clear tendency for defibrillators to be used by the laity before the ambulance reaches the patient.

This means that there is a great need for training the users of defibrillators. Such training systems are available, and mainly consist of a training doll (manikin) and an electronic simulator. The defibrillator patient cable is connected to contact points on the chest of the training manikin, and the simulator simulates typical heart rhythms, in addition to handling and registering the electric shock. The manikin and/or defibrillator may also contain a report generator, which registers and reports the treatment that is being carried out.

In this training system, the connection of the electrode takes place through galvanic coupling between the manikin and the defibrillator, normally without the use of defibrillation electrodes. The ECG signal that is generated by the simulator is transmitted to the defibrillator through the electrode connections, and the electric shock being discharged from the defibrillator is transmitted the other way, to the manikin. The connections on the manikin must then have a typical patient impedance of approximately 50 Ohm, which must be able to absorb the relatively high energy from the defibrillator. Beyond this, there is no direct communication between the manikin and the defibrillator.

This has several disadvantages: Visible contact points are used for connecting the defibrillator. This means that there is no opportunity for practicing realistic placement of electrodes based on anatomical references, or for practicing the manipulation that is required for effective connection and placement of the electrodes.

When the defibrillator is used, it will normally give off an energy pulse of between 200 Joules and 360 Joules. The disadvantage of this is that the electronics in the manikin must handle both high voltages and high effects, which makes the solution both large and costly. A further disadvantage is the fact that students may be exposed to high voltages, something that constitutes a safety risk. The fact that the energy is drawn from the defibrillator battery is another disadvantage, as more and more defibrillators are equipped with expensive, non-rechargeable primary batteries based on lithium.

There are training defibrillators available that do not have the disadvantages of high voltage and expensive lithium batteries. These devices, however, do not interact with the manikin, and will operate in the same manner whether the electrodes are connected to the manikin or not.

Defibrillators that can run their own training software are also available. In this mode, the defibrillator will not use the high voltage system, instead it will simulate the discharge of electric shocks and the measurements of the electrical activity of the heart. These devices also have no interaction with the manikin, and will operate in the same manner whether the electrodes are connected to the manikin or not.

It is essential to patient treatment that the electrodes be placed in the correct position on the patient, so as to deliver sufficient energy to the heart muscle. This correct emplacement is dependent on the user having been trained correctly, e.g. by practicing on a manikin.

SUMMARY OF THE INVENTION

Thus, the object of the present invention is to provide a manikin on which an indication of correct placement is given, without the user in advance being able to see any markings of correct placement or earlier placement on the manikin. Thus, the user must find the correct position on the manikin based on anatomy, and at the same time receive feedback regarding the accuracy of the placement.

BRIEF DESCRIPTION OF THE DRAWINGS

The following describes the invention in more detail, with reference to the drawings, in which.

DETAILED DESCRIPTION OF PREFERRED EMBODIMENTS

Figure 1:
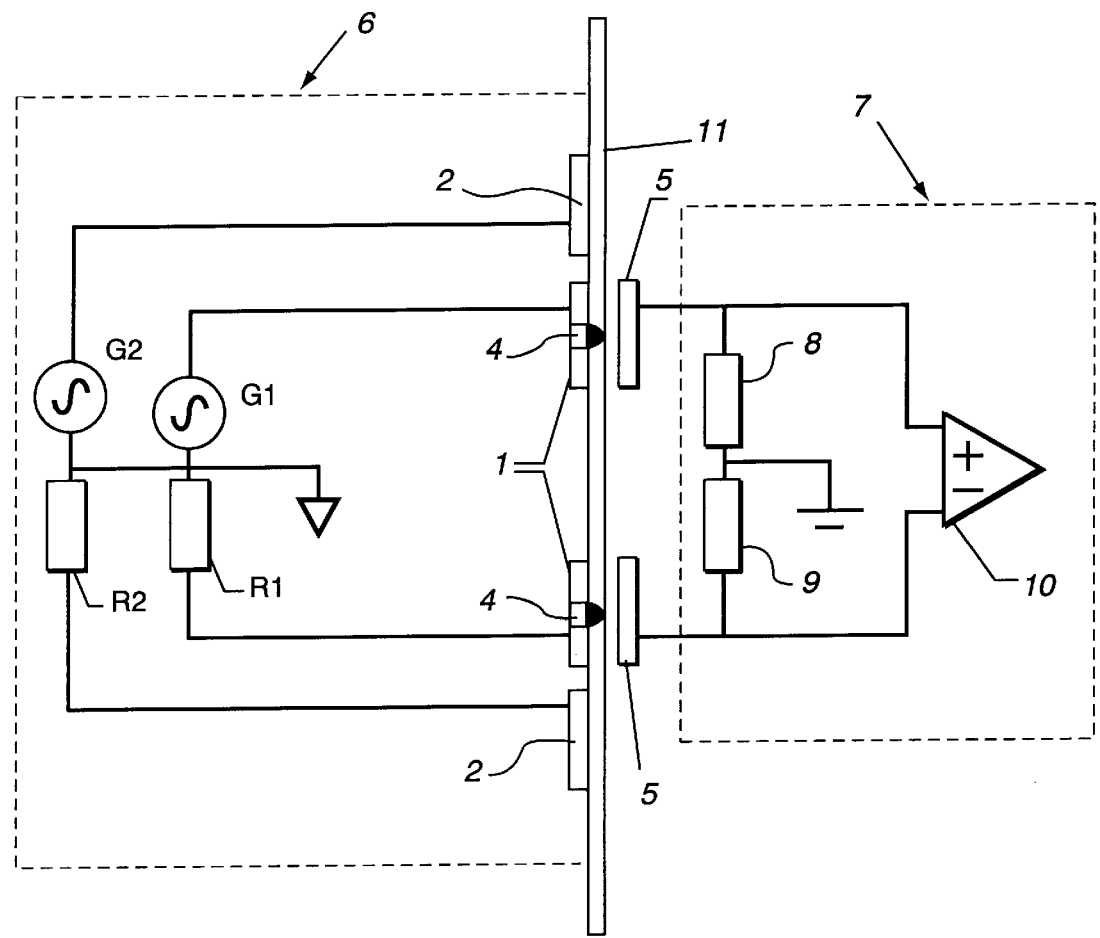
FIG. 1. shows components and principal for electrical coupling and the current path through the defibuillator, in which the electrodes and electric conductive faces are shown in cross-section.
Figure 2:
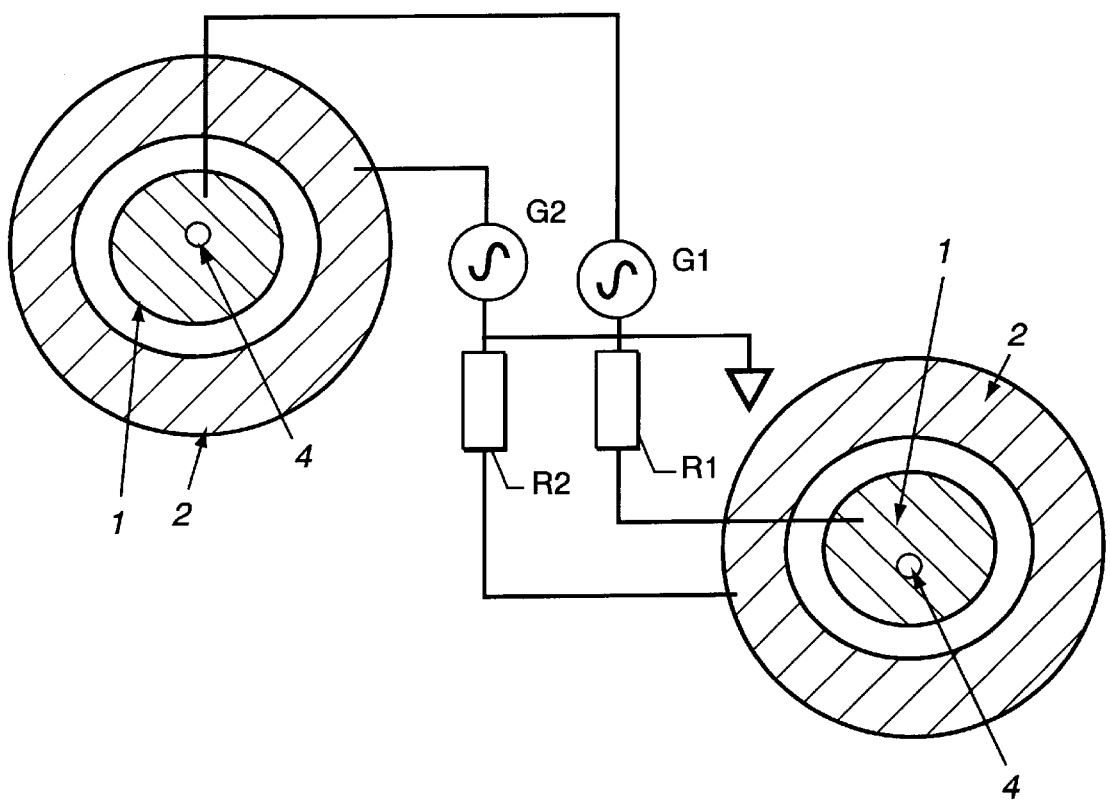
FIG. 2 indicates how the electrical conductive faces under the manikin skin may be provided and be coupled to corresponding drive circuits.

FIG. 2 shows sensors consisting of two concentric faces 1, 2 that in a finished manikin are hidden underneath the manikin skin, in places that correspond to the right and wrong positions for placement of the electrodes respectively, and which constitute the respective halves of a capacitor. The faces 1, 2 consist of electrically conductive materials, such as metal foil, conductive plastic film, carbon print etc. These faces 1,2 are connected to different oscillators G1 and G2, which deliver two different frequencies.

Oscillator G1 supplies signals to the two locations 1 inside the manikin 6 that form the respective halves of the capacitors, and which in terms of geometry and position correspond to the correct placement of the defibrillator electrodes. The current through oscillator G1 is measured over a resistance R1.

Oscillator G2 supplies signals to the two locations 1 inside the manikin 6 that form the respective halves of the capacitors, and which in terms of geometry and position correspond to the correct placement of the defibrillator electrodes. The current through oscillator G2 is measured over a resistance R2.

The other halves of the above mentioned capacitors are formed by the defibrillator electrodes 5. As a consequence of defined input impedance 8, 9 between the defibrillator electrodes, the two oscillators G1 and G2 can drive a current through the defibrillator-input impedance 8, 9. This current is measurable in the manikin 6 by the voltage drop over the resistances R1 and R2. The same current is measurable by the use of the signal-input port of the defibrillator, where the current through the input impedance generates a measurable signal. In terms of frequency, this signal is set at a level where it may either be connected to the ECG measuring system or the impedance measuring system in the defibrillator.

This means that both the manikin and the defibrillator can analyze the same signal, and thus indicate whether or not the electrodes have been placed in the correct position. In the case of incorrect positioning, there may be provided a signal transmitter inside the manikin that will alert the user to this, by the use of light sources, e.g. light-emitting diodes that shine through the manikin skin, by activation of a sound signal etc.

The relative amplitude of the frequency component f1, f2 of the signal will, through the use of signal analysis, indicate the position. Correct positioning is indicated by a high contribution of signal component f1 from generator G1, together with a low contribution of signal component f2 from generator G2. Correspondingly, incorrect positioning will be indicated by a high contribution of signal component 02 from generator G2.

Signal analysis is carried out by converting the measured signal, either in the manikin or the defibrillator, to a digital form, and by using digital filters in the defibrillator software to discriminate the frequency components, and by having the software compare the amplitude of frequency f1 with the amplitude of frequency f2.

The current that is set up through the capacitors that form the connection through the chest skin may be bi-directional. Thus, it can also be used for two-way communication between the manikin and the defibrillator, alternatively between the manikin and the training defibrillator.

A solution may also be envisaged where these methods are used for measuring the position of the electrodes only, and where all communication between the manikin and the defibrillator/practice defibrillator takes place through a wireless medium, across another interface.

This may be in the form of radio communication, where for example the electrode cables are used as an antenna. Other antenna solutions may also be envisaged. Alternatively, other forms of communication may be used, such as light, primarily in the form of IR light, or sound, primarily in the form of ultrasound.

Any form of analog or digital modulation may be used for wireless communication, e.g. FM, AM, CW, BPSK (Binary Phase Shift Keying), QPSK (Quadrature Phase Shift Keying), FSK (Frequency Shift Keying), M-FSK (M-ary Frequency Shift Keying).

The receiver in the defibrillator may in its simplest form use the ECG amplifier as a receiver for the signals from the manikin. The ECG amplifier may have several modes of operation, in which it changes the frequency characteristics when in practice mode, so as to be able to transmit relatively high frequency signals.

The transmitter in the defibrillator may in its simplest form consist of a shock delivery circuit with several modes of operation, in which it delivers harmless and electrically safe micropulses when in training mode.

Known systems for measuring impedance and systems for measuring electrodes connection may also be used as a transmitter in the defibrillator. These systems are normally based on a low alternating current being sent through the patient electrodes. Obviously, this may also be used to communicate with the manikin, in a modulated or non-modulated form.

Defibrillators often use relay connections for delivering electroshocks. Switching this relay connection on and off will cause a change in impedance in the defibrillator patient circuit. This change in impedance may also be used for communication between the defibrillator and the manikin.

The transmitter and the receiver may also be realized as circuit solutions that are independent of the ECG amplifier, the shock delivery circuit and the systems for measuring impedance.

A defibrillator that is designed for communication with a manikin and detection of electrode positions can automatically detect whether it is connected to training equipment or a patient. If the defibrillator is connected to a patient, it will automatically set itself to treatment mode, as the impedance of the patient is distinctive. If the defibrillator is connected to training equipment, it will automatically set itself to practice mode, by the training equipment transmitting an identification signal that the defibrillator can identify, or by the defibrillator sending out an identification signal that the training equipment returns to the defibrillator, altered or unaltered.

Both special practice electrodes and treatment electrodes may be used. These are connected to the defibrillator through a cable, and are glued or otherwise fixed on the manikin chest.

What is claimed is:

1. A system for detection of the position of electrodes of a training defibrillator on a training manikin comprising:
    a training defibrillator comprising an open electrical circuit and a plurality of electrodes; and
    a training manikin comprising an open electrical circuit, skin and a first and second set of electrical conductive faces disposed in hidden positions under said skin, wherein said first set of faces corresponds to a correct position for placement of said defibrillator electrodes and said second set of faces corresponds to an incorrect position for placement of said defibrillator electrodes,
    wherein said defibrillator electrodes and said electrical conductive faces each constitute a half of a capacitor, such that a closed electrical circuit is formed when said electrodes are placed in a location corresponding to the location of said electrical conductive faces, and
    wherein the location of said defibrillator electrodes is determined from the measurement of the current through each of said electrical conductive faces.

2. A system as claimed in claim 1, wherein the current is determined by the voltage drop over resistors, which are connected to each of the electrical conductive faces.

3. A system as claimed in claim 1, wherein at least one oscillator which generates AC current is connected to said closed electrical circuit.

4. A system as claimed in claim 1, wherein a signal transmitter is disposed inside said manikin, which generates a signal from among a light source which shines through said manikin skin and a sound signal.

5. A system as claimed in claim 1, comprising a signal analyzing device disposed in one of said defibrillator and said manikin, and a first oscillator disposed within said manikin and connected to said first set of electrical conductive faces, and a second oscillator disposed within said manikin and connected to said second set of electrical conductive faces, wherein the position of the electrodes is determined by the measurement of the current through said closed circuit.

6. A system for detection of the position of electrodes of a training defibrillator on a training manikin comprising:

a training defibrillator comprising an open electrical circuit and a plurality of electrodes; and a training manikin comprising an open electrical circuit, skin and a set of electrical conductive faces disposed in hidden positions under said skin, wherein said set of faces corresponds to a correct position for placement of said defibrillator electrodes, wherein said defibrillator electrodes and said set of electrical conductive faces each constitute a half of a capacitor, such that a closed electrical circuit is formed when said electrodes are placed in a location corresponding to the location of said electrical conductive faces, and wherein the location of said defibrillator electrodes is determined from the measurement of the current through each of said electrical conductive faces.

7. A system as claimed in claim 6, wherein the current is determined by the voltage drop over resistors, which are connected to each of the electrical conductive faces.

8. A system as claimed in claim 6, wherein at least one oscillator which generates AC current is connected to said closed electrical circuit.

9. A system as claimed in claim 6, wherein a signal transmitter is disposed inside said manikin, which generates a signal from among a light source which shines through said manikin skin and a sound signal.

10. A system as claimed in claim 6, comprising a signal analyzing device disposed in one of said defibrillator and said manikin, and an oscillator disposed within said manikin and connected to said set of electrical conductive faces, wherein the position of the electrodes is determined by the measurement of the current through said closed circuit.

* * * * *